… … …

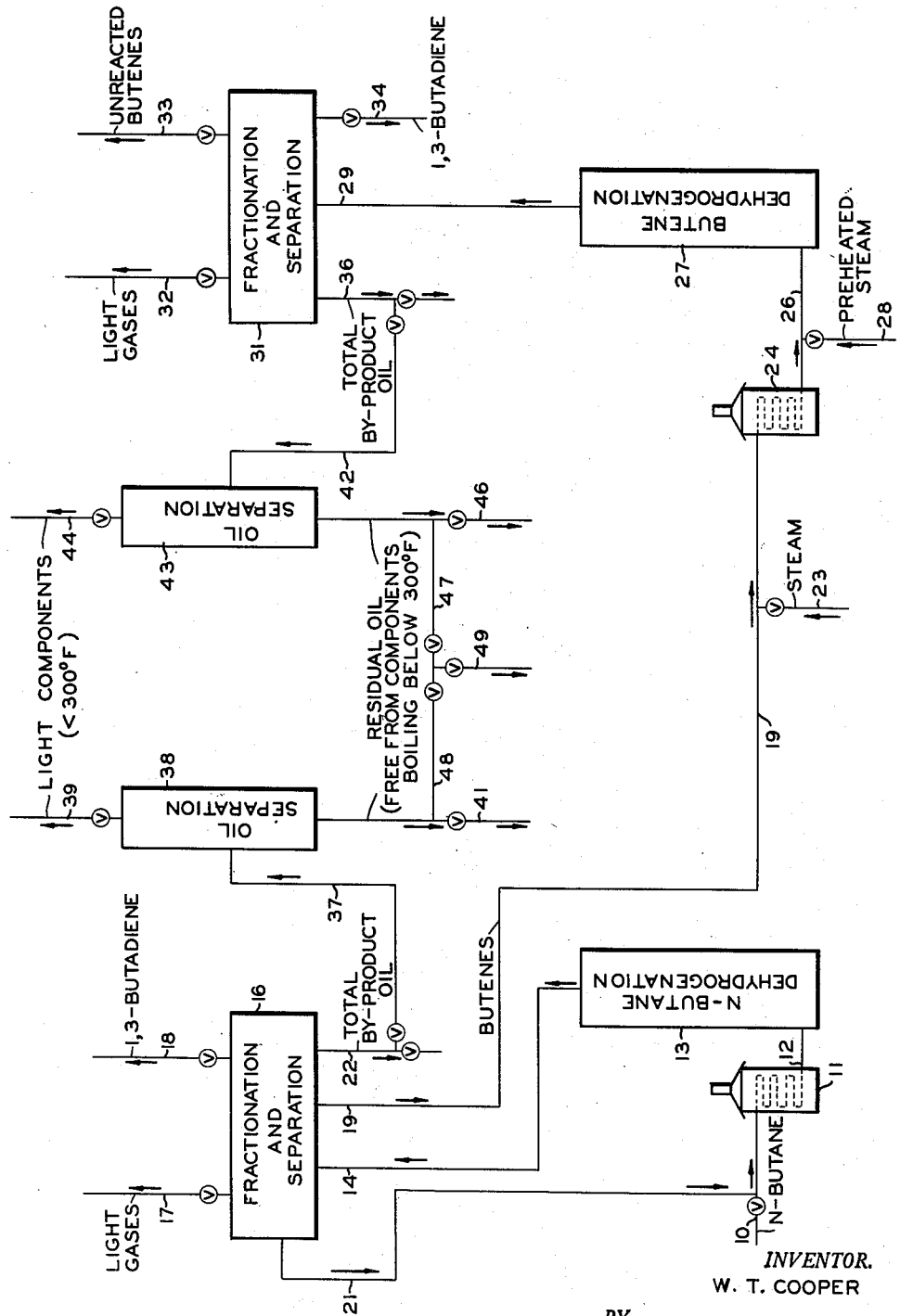

UNITED STATES PATENT OFFICE 2,625,528

PROCESSING OF SULFUR-VULCANIZABLE MATERIALS, AND RELATED COMPOSITIONS

William T. Cooper, Phillips, Tex., assignor to Phillips Petroleum Company, a corporation of Delaware Application April 6, 1951, Serial No. 219,708

17 Claims. (Cl. 260—33.6)

This invention relates to plasticizers and extenders and to their utilization in processing sulfur-vulcanizable organic plastic substances containing unsaturated carbon-to-carbon bonds, and to compositions associated with such processing. In one embodiment, this invention relates to a method for plasticizing natural and synthetic rubbers. In another embodiment this invention relates to a method for extending natural and synthetic rubbers. In still another embodiment this invention relates to new compositions comprising natural rubber and synthetic rubber each incorporated with a total residual by-product of catalytic dehydrogenation of a $C_4$ hydrocarbon to produce a less saturated $C_4$ hydrocarbon, from which all components boiling below 300° F. have been removed.

Rubber stocks are tough and nonplastic and must be softened or rendered in a plastic condition to facilitate processing with ingredients to be incorporated therewith. Examples of such ingredients are reinforcing pigments such as carbon black, fillers such as zinc oxide, various accelerators, sulfur, and the like. These compounding materials are among those which in various combinations impart to the vulcanizate improvements in such properties as abrasion resistance, flex life, hysteresis, resistance to tear, tensile strength, elongation, modulus, etc.

Mixing of tough rubber stocks with compounding ingredients is generally effected by means of mastication at a controlled temperature in the range of 50–350° F. Mastication involves mechanically kneading the rubber material, either by passing it through an open mill, i. e., passing it between rollers running at different speeds whereby it is subjected to compression followed by a shearing action, or by placing it in an enclosed mixer of the Banbury type where much the same effect is produced. The open mill and the Banbury type mixer comprise standard equipment in compounding rubber. Various known agents which are used to accelerate milling by virtue of their affinity for the rubber or rubberlike material are referred to hereinafter as "plasticizers" or "softeners," i. e., as applied to synthetic, natural, and reclaimed rubber.

Various types of materials have been employed as softeners or plasticizers for both natural and synthetic rubbers and it is known that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished product, i. e., the vulcanizate, is of little value for many purposes. One of the disadvantages of some synthetic elastomers is that they do not possess sufficient tack. A plasticizer which gives a product of improved tack as well as other good physical properties is highly desirable.

I have now discovered novel softeners and extenders, which by their incorporation with rubber stocks, are good rubber plasticizers and tackifiers and also impart other desirable properties to the rubber. These materials are applicable in compounding natural and synthetic rubbers and reclaimed rubber, and they can be used alone as softeners and tackifiers in a compounding recipe or as mixtures with each other, or in conjunction with other softeners. They are effective not only as extenders, plasticizers and tackifiers but the rubber in which they are used shows particularly good flex life and tensile strength.

An object of this invention is to provide new and novel plasticizers and extenders for utilization with natural and synthetic rubbers. Another object is to provide a method for plasticizing and extending sulfur vulcanizable organic plastic substances containing unsaturated carbon-to-carbon bonds. Another object is to provide new compositions each comprising a sulfur vulcanizable organic plastic substance containing unsaturated carbon-to-carbon bonds, incorporated with that portion of a total residual by-product of catalytic dehydrogenation of a $C_4$ hydrocarbon to produce a less saturated $C_4$ hydrocarbon, from which all components boiling below 300° F. have been removed. Another object is to provide selected vulcanizates as new compositions. Other objects will be apparent to one skilled in the art from the accompanying discussion and disclosure.

The term "sulfur vulcanizable organic plastic substance containing unsaturated carbon-to-carbon bonds" is meant herein to be generic to natural rubber, synthetic rubber and reclaimed rubber.

One well known method for the manufacture of 1,3-butadiene involves a series of steps in which n-butane is dehydrogenated in the presence of a catalyst to produce predominantly 1-butene and 2-butene, followed by a plurality of fractionation steps for the recovery of the butene products formed, catalytic dehydrogenation of the recovered butenes to produce 1,3-butadiene, and finally a plurality of fractionation steps for the recovery of the 1,3-butadiene so produced. During each of these catalytic dehydrogenation steps a residual by-product oil is formed, and comprises a mixture of heavier hydrocarbons containing from 5 carbon atoms up to as high as 20 carbon atoms per molecule and higher. Precise molecular structures of the heavier oil components are not known. I have discovered that the total by-product oil thus formed in either of the catalytic dehydrogenation steps described from which all components boiling below 300° F. have been removed, is an excellent plasticizer-extender for natural rubber, synthetic rubber or rubber substitutes, and reclaimed rubber, and that it imparts excellent characteristics to vulcanizates formed from compounded rubbers containing it. I have provided in accordance with my invention a method employing such a residual by-product oil as that described, for plasticizing and extending sulfur vulcanizable organic plastic substances containing unsaturated carbon-to-carbon bonds, and for compositions comprising such organic plastic substances incorporated with such a residual oil by-product, including the compounded rubber containing the residual oil, and vulcanizates formed from such a compounded rubber.

In order to describe in some detail the origin of the novel plasticizer-extenders of my invention, reference is made to the attached drawing which is a diagrammatic flow sheet illustrative of the operation of a multi-step system for the manufacture of 1,3-butadiene utilizing n-butane as a starting material. It is to be understood that the drawing is diagrammatic and can be altered in many respects by those skilled in the art and still depict the manner in which the plasticizer-extender materials of my invention are formed. With reference to the figure, n-butane from line 10 is preheated in preheat chamber 11 to a temperature generally within the range of from about 1000 to 1200 F. more often to about 1100 F., and then passed from zone 11 through line 12 into n-butane dehydrogenation chamber 13 containing a catalyst active in promoting dehydrogenation of n-butane to form 1-butene and 2-butene. Such a catalyst is frequently one consisting essentially of alumina and chromia, preferably one containing chromia in a minor proportion, as for example one containing from 15–40 per cent chromia and 60–85 per cent alumina. One such catalyst used commercially is a 20 per cent chromia-80 per cent alumina catalyst. n-Butane feed is passed through chamber 13 at a space velocity within the limits of 300 and 1000, more often within the limits of 500 and 750 standard gas volumes per catalyst volume per hour at the prevailing temperature, although it is varied dependent upon the activity of the catalyst. Total effluent from n-butane dehydrogenation zone 13 is passed through line 14 into total effluent fractionation system 16 comprising fractionation equipment, i. e. distillation and solvent extraction means, separators, storage tanks and the like, not specifically illustrated, which may be utilized in the separation and recovery of various components in the zone 13 effluent, particularly butenes to be further dehydrogenated to form butadienes. Light gases, including hydrogen, C1, C2, and C3 hydrocarbons are withdrawn from fractionation system 16 through line 17. Butadiene formed in relatively small amounts in zone 13, is separated in zone 16 and withdrawn through line 18. Any n-butane present in effluents from chamber 13 is separated in zone 16 and withdrawn through line 21 for recycle to line 10. Butenes, predominantly 1-butene and 2-butene, are discharged from fractionation system through line 19.

A by-product oil formed during the dehydrogenation reaction in chamber 13 is withdrawn from fractionation system 16 through line 22. Oil withdrawn through line 22 represents total residual by-product, i. e. heavier than C4's, of the catalytic dehydrogenation reaction effected in chamber 13 and comprises C5 and heavier hydrocarbons including non-aromatics, aromatics, and naphthalene hydrocarbon derivatives, including several oil components having definite boiling ranges but whose structure is not known with particularity. The following tabulation presents a typical analysis of a by-product oil formed in chamber 13 and withdrawn from the system through line 22:

| | Liq. vol. per cent |
|---|---|
| A. Non-aromatic hydrocarbons: | |
| $C_5$'s | 0.6 |
| 4-vinyl cyclohexene-1 (butadiene dimer) | 2.8 |
| 5-methyl 1,3-cyclohexadiene | 2.1 |
| 2-methyl 1,3-cyclohexadiene | 2.1 |
| 2,3-dimethyl 1,3-cyclohexadiene | 1.0 |
| Unidentified component (cut No. 7) | 1.8 |
| B. Aromatic hydrocarbons: | |
| 1. Benzene and derivatives— | |
| Benzene | 0.7 |
| Toluene | 4.0 |
| Ethyl benzene | 9.6 |
| P-xylene | 6.8 |
| M-xylene | 2.7 |
| O-xylene | 17.7 |
| Isopropyl benzene | 4.0 |
| 1,2,3- and 1,2,4-trimethyl benzenes | 0.9 |
| Octyl benzene and similar aromatics | 4.0 |
| 1,3-dimethyl 4-ethenyl benzene | 1.9 |
| 2. Naphthalene derivatives and miscellaneous— | |
| Naphthalene | 1.3 |
| 1,4-diisobutyl naphthalene | 2.5 |
| Blue oil (B. pt. 445–490 F.) possibly derivative of azulene | 11.0 |
| Green oil (B pt. 495–525 F.) possibly derivative of hexacene or heptacene | 7.0 |
| Yellow oil (possibly terpenes) | 0.5 |
| Kettle residue | 15.0 |
| | 100.0 |

The above analysis is presented on a $C_4$-free basis. It is understood that in some instances a very small amount of $C_4$ hydrocarbons may be present in the material withdrawn through line 22 inasmuch as under some conditions the fractionation may not have been so precise as to separate completely the oil by-product from $C_4$'s.

Butenes in line 19 comprising 1-butene and 2-butene and containing in some instances a small proportion of isobutene, are admixed with steam, introduced into line 19 through line 23, and the resulting steam-butene admixture is passed into preheat chamber 24 and heated therein to a temperature generally within the limits of about 1100 and 1300 F., often at about 1150–1250° F. Effluent steam-butenes from zone 24 is passed through line 26 into dehydrogenation zone 27 containing a catalyst active in promoting dehydrogenation of a butene to form 1,3-butadiene. Alternatively steam is preheated to 1200–1400° F. and introduced into line 26 from line 28 and the butene steam from line 19 is heated in zone 24 to 900 to 1100° F.; and the resulting steam-butene mixture is passed at its existing temperature into zone 27. The catalyst, employed in zone 27 is generally one high in iron oxide content, as for example, a catalyst containing from 70–95 per cent $Fe_2O_3$ including a minor amount of $Fe_3O_4$, 3–20 per cent chromia and from 2 to 20 per cent KOH. A catalyst comprising about 93 per cent $Fe_2O_3$, 5 per cent $Cr_2O_3$ and 2 per cent KOH has been frequently used commercially. Butenes from line 26 are passed through dehydrogenation zone 27 at a hydrocarbon space velocity generally within the limits of 200 and 500 standard gas volumes of total butenes per catalyst volume per hour. Steam is generally introduced into chamber 27 in a mol ratio to total hydrocarbon within the limits of about 8:1 to 15:1. Total effluents from chamber 27 are passed through line 29 into fractionation and separation system 31, comprising various product recovery and separation means not individually illustrated such as fractionation equipment, i. e. distillation and solvent extraction means, separators, storage tanks, and the like. Light gases comprising hydrogen, $C_1$, $C_2$, and $C_3$ hydrocarbons are passed from fractionation system 31 through line 32. Unreacted butenes are withdrawn from fractionation system 31 through line 33 for recycle if desired. 1,3-butadiene product, of specification grade, is withdrawn from zone 31 through line 34. A total by-product oil, formed during the dehydrogenation in zone 27, is withdrawn from zone 31 through line 36. Oil withdrawn through line 36 comprises total residual by-product, i. e., heavier than $C_4$'s, of the catalytic dehydrogenation in zone 27 and comprises hydrocarbons containing at least 5 carbon atoms in a molecule and at least as high as 20 carbon atoms in the molecule, the molecular structure of some of the components thereof having not as yet been established with certainty. The following tabulation presents a typical analysis of a total by-product oil formed in chamber 27 and withdrawn from the system through line 36:

*Olefins*

| | Per cent |
|---|---|
| Pentene-1 | 4.7 |
| 2-methyl-1-butene | 15.5 |
| 2-methyl-2-butene | 5.1 |
| Methyl pentenes | 2.1 |
| Methyl hexenes | 2.8 |
| Dimethyl pentenes | 2.8 |
| Dimethyl hexenes | 2.1 |

*Diolefins*

| | |
|---|---|
| 1,4-pentadiene | 1.7 |
| 2-methyl-1,3-butadiene | 9.5 |
| 3-methyl-1,2-butadiene | 6.3 |
| 1,2- and 1,3-pentadiene | 3.6 |
| 2-methyl-1,4-pentadiene | .9 |
| 1,4- and 1,5-hexadienes | .7 |
| Methyl pentadienes | 2.1 |
| 5-methyl-1,3-cyclohexadiene | 2.2 |
| 5,5- and 1,5-dimethyl hexadienes | 5.2 |
| 4-vinyl-1-cyclohexene ($C_4H_6$ poly) | 3.8 |

*Aromatics*

| | |
|---|---|
| Benzene | 3.2 |
| Toluene | 9.4 |
| Ethylbenzene | 1.7 |
| Xylenes | 8.0 |
| Styrene | .5 |
| 1- and 2-phenyl-2-butenes | .9 |
| Blue oil (398–460 F.) | 1.2 |
| Green oil (468–485 F.) | .8 |
| Kettle residue | 3.2 |
| | 100.0 |

It is to be understood that in some instances dependent upon the operation of fractionation system 31, some $C_4$ hydrocarbons may be present in the total residual oil by-product recovered through line 36.

The total residual oil in line 22, freed of all components boiling below 300° F. as measured at atmospheric pressure, is exemplary of one of the plasticizer-extenders of my invention. Separation of those lower boiling components from the total oil can be effected by passing the oil from line 22 through line 37 into separation zone 38, generally a distillation step, wherein all components boiling below 300° F. are separated, and are then withdrawn through line 39. Residual oil separated in zone 38, i. e., total oil from line 22 freed of all components boiling below 300° F. is withdrawn through line 41 as a plasticizer-extender of my invention.

The total residual oil in line 36, freed of all components boiling below 300° F. as measured at atmospheric pressure, is exemplary of another plasticizer-extender of my invention. Separation of those lower boiling components from the oil in line 36 can be effected by passing the oil from line 36 through line 42 into separation zone 43, generally a distillation step wherein all components boiling below 300° F. are separated, and then withdrawn through line 44. Residual oil withdrawn and separated in zone 43, i. e., total oil from line 36, freed of all components boiling below 300° F., is withdrawn through line 46 as a plasticizer-extender of my invention.

Although I have stated that a by-product oil such as that withdrawn through line 41 or line 46 can be utilized in the practice of my invention as a plasticizer-extender, it is to be understood that mixtures of these oils can be utilized also. Accordingly, if desired, oil by-product from line 41 can be passed through line 48 into line 49 in admixture with oil by-product from line 46 passed into line 49 through line 47. The mixture containing the components from lines 41 and 46 in any desired proportion is then withdrawn from the system through line 49 as a plasticizer-extender of my invention.

The proportions of the plasticizer-extender materials employed with respect to the rubber stock in accordance with my invention vary, depending upon the type rubber being processed and the properties desired in the finished product, i. e., the plasticizer-rubber product preceding or subsequent to vulcanization or both as desired. Generally the amount of plasticizer-extender employed is within the limits of from 1 to 50 parts by weight per 100 parts by weight of rubber stock. When plasticizing relatively high Mooney synthetic elastomers, for example those having raw Mooney values of 90 or above as for example as high as 160 (ML–4), it is usually advantageous to employ relatively large quantities of plasticizer, for example from 15 to 50 parts by weight per 100 parts by weight of rubber. When plasticizing relatively low Mooney synthetic elastomers, i. e., those having a raw Mooney value below 90, as from about 20 to 90, that amount is in the range of from about 1 to 25 parts, often from 2 to 10 parts. When referring herein to Mooney value, it is meant that Mooney viscosity as determined in accordance with the ASTM method, D927–49T.

I can incorporate the softeners of my invention with the material to be plasticized by any suitable method, such as (1) by adding the softener either directly or as a dispersion to a synthetic rubber latex and then coagulating the latex in accordance with latex masterbatch procedure, or (2) introducing the softener on the mill.

The following example serves to illustrate further a process for plasticizing natural and synthetic rubber and a new and novel plasticizer-containing composition formed in accordance with my invention in which I mean to include those new compositions in their form before vulcanization and also after vulcanization. The reactants and their proportions and other specific ingredients employed, as illustrated in the examples, are presented as being typical and should not be construed to limit the invention unduly.

The compounded stocks were milled and cured 30 minutes at 307° F., except as otherwise specified (in the following tabulation), and physical properties of each vulcanizate were determined. The following evaluation data were obtained.

| Plasticizer | PHR[3] softener | 80° F. | | | 200° F.[4] Tensile, p. s. i. | ΔT° F. | Percent resilience | Flex[5] life, M | Shore hardness | Abrasion[6] loss, grams | Percent comp. set | MS 1½ at 212° F. | Extrusion at 250° F. | |
|---|---|---|---|---|---|---|---|---|---|---|---|---|---|---|
| | | 300% modulus, p. s. i. | Tensile, p. s. i. | Percent elongation | | | | | | | | | In./min. | Gms./min. |
| n-Butane dehydrogenation by-product oil[7] | 5 | 1,420 | 3,720 | 570 | 2,300 | 70.9 | 60.1 | 23.3 | 58 | 2.93 | 19.0 | 47 | 37 | 96.5 |
| n-Butane dehydrogenation by-product oil[7] | 10 | 1,180 | 3,600 | 620 | 2,020 | 75.0 | 60.8 | 11.0 | 56 | 3.15 | 19.5 | 41.5 | 35.5 | 98.5 |
| Circosol 2XH-Paraflux blend[1] | 10 | 1,140 | 3,400 | 630 | 2,110 | 71.6 | 60.9 | 24.4 | 55 | 4.14 | 18.6 | 42 | 36 | 97.8 |
| Paraflux | 10 | 1,110 | 3,570 | 645 | 2,310 | 72.6 | 59.9 | 40.0 | 56 | 4.05 | 18.4 | 42 | 38.5 | 100 |
| Asphalt No. 6[2] | 10 | 1,200 | 3,560 | 660 | 2,200 | 73.6 | 57.8 | 31.7 | 59 | 3.68 | 21.0 | 48 | 36.8 | 98.5 |
| OVEN AGED 24 HOURS AT 212° F. | | | | | | | | | | | | | | |
| n-Butane dehydrogenation by-product oil[7] | 5 | 2,800 | 3,780 | 380 | | 62.5 | 64.3 | 12.9 | 65 | 3.97 | | | | |
| n-Butane dehydrogenation by-product oil[7] | 10 | 2,440 | 3,970 | 430 | | 63.2 | 64.8 | 9.8 | 64 | 4.01 | | | | |
| Circosol 2XH-paraflux blend | 10 | 1,980 | 3,510 | 460 | | 57.1 | 64.2 | 10.5 | 61 | 4.85 | | | | |
| Paraflux | 10 | 2,040 | 3,730 | 495 | | 58.5 | 65.1 | 15.3 | 62 | 4.63 | | | | |
| Asphalt No. 6 | 10 | 2,030 | 3,430 | 455 | | 61.2 | 62.7 | 4.8 | 65 | 4.83 | | | | |

[1] Equal parts Circosol 2XH with Paraflux. Circosol 2XH: petroleum hydrocarbon softener containing high molecular weight hydrocarbons; sp. gr. 0.940; Saybolt viscosity at 100° F., about 2000 seconds. Paraflux: saturated polymerized hydrocarbon.
[2] Asphalt softener.
[3] Parts per 100 parts rubber.
[4] 45 minute cure.
[5] Thousands of flexures to failure.
[6] 35 minute cure.
[7] Total by-product oil described above from which all components boiling below 300° F. have been removed.

EXAMPLE I

A total residual oil by-product recovered from the effluent of catalytic butane dehydrogenation of the type illustrated with reference to the drawing as effected in dehydrogenation chamber 13 and withdrawn from the system through line 41, i. e., total oil from line 22 from which all components boiling below 300° F. as measured at atmospheric pressure have been removed was employed as a plasticizer in the following tread recipe using a 41° F., 60 Mooney (ML-4), 71/29 butadiene-styrene elastomer. Three commercial softeners were evaluated as controls for purpose of comparison. The n-butane dehydrogenation during which the butane dehydrogenation by-product oil was formed was effected in the presence of a 20 per cent chromia-80 per cent alumina catalyst, at a space velocity of about 662 gaseous volumes n-butane per catalyst volume per hour, at a temperature of about 1040° F. The following compounding recipe was employed.

| | Parts by weight |
|---|---|
| Butadiene/styrene elastomer | 100 |
| Philblack O[1] | 50 |
| Zinc oxide | 3 |
| Stearic acid | 1 |
| Flexamine[2] | 1 |
| Sulfur | 1.75 |
| Santocure[3] | 1 |
| Softener | Variable[4] |

[1] High abrasion furnace black.
[2] A physical mixture containing 65 per cent of a complex diarylaminoketone reaction product and 35 per cent of N,N'-diphenyl-p-phenylenediamine.
[3] N-cyclohexyl-2-benzothiazolesulfenamide.
[4] 5 and 10 parts, respectively, for the butane dehydrogenation residue and 10 parts for each of the commercial softeners.

As will be evident to those skilled in the art, various modifications can be made or followed in the light of the foregoing disclosure and discussion without departing from the spirit or scope of the disclosure or from the scope of the claims.

I claim:

1. A method for increasing the plasticity of a rubbery sulfur-vulcanizable organic plastic substance containing unsaturated carbon-to-carbon bonds, comprising incorporating with 100 parts by weight of such an organic plastic substance from 1 to 50 parts by weight of a total residual oil by-product of catalytic dehydrogenation of a $C_4$ hydrocarbon at a temperature within the range of 1000–1300° F. to produce a less saturated $C_4$ hydrocarbon, said total oil being freed of all components boiling below 300° F. as measured at atmospheric pressure.

2. The method of claim 1 wherein said by-product oil is formed during a dehydrogenation of n-butane in the presence of a catalyst comprising alumina in a major proportion and chromia in a minor proportion, at a temperature within the range of from 1000 to 1200° F.

3. The method of claim 1 wherein said by-product oil is formed during a dehydrogenation of a $C_4$ monoolefin to form a $C_4$ diolefin at a temperature within the limits of 1100 and 1300° F. in the presence of a catalyst comprising iron oxide, chromia and potassium hydroxide.

4. As a new composition a rubbery sulfur-vulcanizable organic plastic substance containing unsaturated carbon-to-carbon bonds incorporated with a total residual by-product oil formed during a catalytic dehydrogenation of a $C_4$ hydrocarbon at a temperature within the range of 1000–1300° F. to produce a less saturated $C_4$ hydrocarbon, freed of all components boiling below 300° F. as measured at atmospheric pressure.

5. The composition of claim 4 wherein said by-product oil is formed during the catalytic dehydrogenation of n-butane to form butenes as chief dehydrogenation product.

6. The composition of claim 4 wherein said by-product oil is formed during a catalytic dehydrogenation of a butene to form 1,3-butadiene as the chief dehydrogenation product.

7. A composition comprising 100 parts by weight of a sulfur-vulcanizable synthetic rubber-like material compounded with from 1 to 50 parts by weight of a plasticizer material comprising a total residual by-product oil formed during the catalytic dehydrogenation of a $C_4$ hydrocarbon at a temperature within the range of 1000–1300° F. to produce a less saturated $C_4$ hydrocarbon, freed of all components boiling at 300° F. as measured at atmospheric pressure.

8. The composition of claim 7 wherein said plasticizer material is formed during the catalytic dehydrogenation of normal butane at a temperature within the limits of 1000 and 1200° F. in the presence of a catalyst consisting essentially of alumina in a major proportion and chromia in a minor proportion.

9. The composition of claim 7 wherein said plasticizer material is a by-product oil formed during catalytic dehydrogenation of a butene in the presence of a catalyst consisting essentially of iron oxide in a major proportion and chromia and potassium hydroxide each in a minor proportion.

10. The product of vulcanization of 100 parts by weight of a rubbery sulfur-vulcanizable organic plastic substance containing saturated carbon-to-carbon bonds, which has been vulcanized with sulfur in the presence of from 1 to 50 parts by weight of a total residual oil by-product of catalytic dehydrogenation of a $C_4$ hydrocarbon at a temperature within the range of 1000–1300° F. to produce a less saturated $C_4$ hydrocarbon, said total oil being freed of all components boiling below 300° C. as measured at atmospheric pressure.

11. The product of vulcanization of 100 parts by weight of a sulfur-vulcanizable synthetic rubber-like material which has been vulcanized with sulfur in the presence of from 1 to 50 parts by weight of a total residual oil by-product of catalytic dehydrogenation of a $C_4$ hydrocarbon at a temperature within the range of 1000–1300° F. to produce a less saturated $C_4$ hydrocarbon, said total oil being freed of all components boiling below 300° F. as measured at atmospheric pressure.

12. A vulcanizate of claim 11 wherein said synthetic rubber-like material is a rubbery butadiene-styrene copolymer.

13. A vulcanizate of claim 12 wherein said synthetic rubber-like material is a 71/29 butadiene-styrene elastomer.

14. A product of vulcanization of 100 parts by weight of a butadiene-styrene rubbery copolymer which has been vulcanized with sulfur in the presence of from 1 to 50 parts by weight of a total residual by-product oil freed from all components boiling below 300° F. as measured at atmospheric pressure and formed during the dehydrogenation of n-butane at a temperature within the range of 1000–1200° F. to produce butenes in the presence of a catalyst consisting essentially of a major proportion of alumina and a minor proportion of chromia.

15. A product of vulcanization of 100 parts by weight of a 71/29 butadiene-styrene copolymer vulcanized with sulfur in the presence of from 1 to 50 parts by weight of a total residual oil by-product freed from all components boiling below 300° F. at atmospheric pressure and formed during the catalytic dehydrogenation of n-butane in the presence of a catalyst consisting essentially of 80 per cent alumina and 20 per cent chromia, at a temperature within the limits of 1000 and 1200° F. while employing a space velocity of from 300 to 1000 standard gas volumes of n-butane per volume of said catalyst per hour.

16. As a new composition 100 parts by weight of a sulfur vulcanizable synthetic rubber-like material having a raw Mooney viscosity of from 40 to 90 (ML-4) incorporated with from 2 to 10 parts by weight of a total residual by-product oil freed from all components boiling below 300° F. at atmospheric pressure and formed during the catalytic dehydrogenation of a $C_4$ hydrocarbon to produce a less saturated $C_4$ hydrocarbon at a temperature within the range of 1000–1300° F.

17. As a new composition 100 parts by weight of a sulfur vulcanizable synthetic rubber-like material having a raw Mooney viscosity of at least 90 incorporated with from 15 to 50 parts by weight of a total residual by-product oil freed from all components boiling below 300° F. at atmospheric pressure and formed during the catalytic dehydrogenation of a $C_4$ hydrocarbon at a temperature within the range of 1000–1300° F. to produce a less saturated $C_4$ hydrocarbon.

WILLIAM T. COOPER.

No references cited.